United States Patent
Dietzel et al.

(10) Patent No.: US 6,434,434 B1
(45) Date of Patent: Aug. 13, 2002

(54) ELECTRONIC CONTROL FOR A TRANSMISSION CONTROL SYSTEM

(75) Inventors: Bernd Dietzel, Syrgenstein; Manfred Bek, Heidenheim, both of (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 09/171,357

(22) PCT Filed: Apr. 17, 1997

(86) PCT No.: PCT/EP97/01934

§ 371 (c)(1),
(2), (4) Date: Mar. 22, 1999

(87) PCT Pub. No.: WO97/40426

PCT Pub. Date: Oct. 30, 1997

(30) Foreign Application Priority Data

Apr. 19, 1996  (DE) ......................................... 196 15 519

(51) Int. Cl.$^7$ ........................ G05B 13/02; G06F 17/00; B60K 41/12; B60K 41/22

(52) U.S. Cl. ............................ 700/29; 700/28; 701/51; 192/3.56; 477/48

(58) Field of Search ...................... 700/28, 29; 701/51; 192/3.56; 477/34, 48, 119

(56) References Cited

U.S. PATENT DOCUMENTS

| | | | |
|---|---|---|---|
| 4,388,845 A | * 6/1983 | Kishi et al. | ............... 74/862 |
| 4,476,530 A | * 10/1984 | Pannier et al. | ............. 364/424 |
| 4,649,486 A | * 3/1987 | Oshiage | ............. 364/424.1 |
| 4,855,913 A | 8/1989 | Brekkestran et al. | .... 364/424.1 |
| 5,015,953 A | * 5/1991 | Ferguson et al. | ........... 324/244 |
| 5,053,960 A | * 10/1991 | Brekkestran et al. | ....... 364/424 |
| 5,251,091 A | 10/1993 | Ito et al. | .................... 361/152 |
| 5,461,563 A | 10/1995 | Mimura | ............... 364/424.1 |

FOREIGN PATENT DOCUMENTS

| | | | |
|---|---|---|---|
| DE | 32 25 254 A1 | 1/1984 | ........... G05B/11/26 |
| DE | 34 30 401 A1 | 3/1985 | ........... B60K/20/10 |
| DE | 36 07 329 A1 | 9/1987 | ............. F16H/5/42 |
| DE | 40 12 577 C1 | 4/1991 | ........... G05B/11/16 |

OTHER PUBLICATIONS

English abstract of Japanese patent document No. 07091530.

"Hydrodynamik in der Antriebstechnik", published by J.M. Voith GmbH, Vereinte Fachvertage Krauskopf–Ingenieur Digest, Mainz, 1987.

"Elektronisches Steuerungssystem fuer Automatgetriebe", Voith Research and Design, paper 33 (1989), Voith Print G 1225 (3.89).

"Elektronik" Prof. Dipl.–Ing. Dr. techn. Alexander Weinmann, Marz 1969.

"New Control Valve Accepts Digital Signals," A.W. Langill Jr., H. Friedland, and D.L. Limbacher, Control Engineering, vol. 76, 1969.

"Mikrorechner–Schaltregler für einen Temperaturprüfschrank," Dr.–Ing. F. Freyberger and Dipl.–Ing. J. Chemnitz, Dec. 1979.

* cited by examiner

Primary Examiner—Leo Picard
Assistant Examiner—Elliot Frank
(74) Attorney, Agent, or Firm—Taylor & Aust, P.C.

(57) ABSTRACT

An electro-hydraulic control system with electronic control for a gearbox includes at least one actuator element device for receiving an analog measuring signal from the actuator element(s), a device for forming an actual actuator value from the analog measuring signal for the regulation of the actuator element(s), a computing device with a memory, and an output driver. At least one A/D converter is provided to convert the actual analog actuator element value (U1) and/or the analog actuator element measuring value into a digital value. A digital two-step controller regulates the actuator element(s) by a cyclically-called comparison of theoretical and actual values.

15 Claims, 6 Drawing Sheets

ELECTRONIC CONTROL FOR A TRANSMISSION CONTROL SYSTEM

BACKGROUND OF THE INVENTION

1. Field of the Invention

The present invention relates to control transmissions with hydraulic and mechanical gearing, especially transmissions which are used in commercial utility vehicles.

2. Description of the Related Art

All gear shifts should be smooth under load, regardless of the type of engine or differential transmission that is being applied. These requirements for a transmission control unit are best addressed with an electrohydraulic control system whose operating principle is described in the technical publication "Hydrodynamik in der Antriebstechnik", published by J. M. Voith GmbH, Vereinte Fachverlage Krauskopf-Ingenieur Digest, Mainz, 1987, in the German Patent Document No. DE 36 07 329, or in the paper by M. Bek, "Elektronisches Steuerungssystem fuer Automatgetriebe" Voith research and design, paper 33 (1989), Voith print G 1225 (3.89).

The control system, known from German Patent Document No. DE 36 07 329, is designed for multi-gear power shift transmissions for motor vehicles and includes pressure-actuated clutch elements in the form of either brakes or clutches which are used to engage and change the individual gears. The pressure supply to each of these clutch elements is controlled by a control valve. Furthermore, a control system is provided which determines the shift patterns of the transmission depending upon the various operating conditions, such as rotational input speed and/or rotational output speed of the transmission and the throttle position of the fuel system. The electrohydraulic control system known from the German Patent Document No. DE 36 07 329 is characterized by a control valve which is designed to combine the functions of an electromagnetic shift valve and a pressure regulator valve. The force exerted on the valve body, and causing the movement of same, by the electromagnet's armature is adjustable by varying the strength of the magnetic field. The electromagnet is provided with a device for the formation of a measuring voltage which is proportional to the time-based change of induction, for the purpose of determining a measured variable (responsible for establishing the actual value) which, in turn, is needed for the instantaneous magnetic induction and the subsequent formation of the magnetic force. Connected to the device is at least one integral element which converts the measuring voltage into the measured variable that is proportional to the induction. Furthermore, a control element is provided to form a manipulated value for the exciting current for the electromagnet, by comparing the actual value derived from the integral element with the set point value provided by the control system. Thus, the magnetic force and the subsequent pressure on the hydraulic fluid acting upon the clutch elements is adjusted to the value corresponding to the set point value. Finally, a time element is provided which imposes a time-based limit on the control process at the initiation of a shift action of the transmission so that, subsequently, the actual value and/or the set point value assume a minimum or maximum value.

Electronic control system for such actuators, applied as solenoid valves for electro-hydraulic applications, are extensively described in M. Bek, "Elektronisches Steuerungssystem", Voith research and design, paper 33 (1989), Voith Druck G 1225 (3.89), the disclosure of which is fully incorporated by reference herein. The electrohydraulic control system from the above publication takes advantage of the relationship between the control pressure p of the hydraulic system and the force $F_m$ of the electromagnet as described in the following equation:

$$p = F_m / A_k$$

whereby $A_k$ is the effective area of the control piston. On the other hand, the force exerted by an electromagnet, assuming a small air gap, is approximated by this equation:

$$F_m \approx 1/2 \mu_0 A \cdot \Phi^2$$

wherein:

$\mu_0$: Permeability of air

A: Area of the air gap $\Phi$: magnetic flux formed by the exciting current

In order to determine the actual value of the magnetic force $F_m$ which is required for the electronic control of the magnetic force and, thus, the control pressure p, the magnetic flux must be determined. Concerning this subject matter, the publication (M. Bek, "Elektronisches Steuerungssystem", Voith research and design, paper 33 (1989), Voith print G 1225 (3.89), suggests introducing a measuring coil into the magnetic field of the field coil. According to the induction law, the (magnetic) flux can be obtained from the induced voltage through integration over time. The relationship between the magnetic force and the induced voltage is described as follows:

$$F_m(t) \approx \left( \int_0^t U_m(t) \, dt \right)$$

Hence, in order to obtain the actual value of the magnetic force $F_m$ the induced measured value absorbed by the measuring coil must be integrated.

Until now, the control of the magnetic force was performed by hardware-based analog controllers. The analog controllers were designed as discrete two-step controllers (ref. Dubbel, Reference book for mechanical engineering, Springer Verlag, Berlin, Heidelberg, New York, 1995, pages X8 through X9). The disadvantages of the analog controllers, as published in M. Bek, "Elektronisches Steuerungssystem" . . . , whose control comparators, for example, were applied in form of connected operational amplifiers, are:

Batch-to-batch variability as a result of the integration behavior of the integrators which are used for the individual determination of Fm, making it necessary to balance the circuitry of the analog two-step controller by, for example, soldering resistors onto the appropriate integrator.

When applying a multiplex operation, which is the sequential control of several solenoid valves with one and the same electronic controller, the controller can only be balanced to one integrator.

Influences of the supply voltage $+U_b$ on the magnetic force cannot be taken into account.

A further disadvantage of the analog controllers is the setting of the hysteresis, which is required for the stable operation of a two-step controller (ref. Dubbel, rest as stated above, page X8). The hysteresis is adjusted in these circuits by applying resistors into the circuit design, thereby making a subsequent change to the hysteresis value no longer feasible.

Further, the hardware circuitry assigns a discrete manipulated output value for every actual input value. This rigid relationship does not permit the control of two solenoid valves with one and the same controller.

SUMMARY OF THE INVENTION

With the present invention, the chosen gear befits the vehicle speed and engine load so that optimum engine operating conditions and driveability characteristics can be achieved all times, even under varying driving conditions.

The present invention provides an electronic control system for an electrohydraulic controller of a power shift transmission, as well as establishes a process for controlling such a transmission. The control system overcomes the above-stated disadvantages associated with the state of the art.

An electrohydraulic control system with electronic control for a transmission includes at least one actuator element, a device to accept a measured signal from one actuator element, or a device to accept a plurality of measured signals if one and the same electronic control system serves several actuator elements. The electronic control system further includes a device to form an actual value of the actuator element(s) from the received analog measured signal. This measured signal is used for the control of the actuator element(s). The electronic control system includes an A/D converter, which, in a first embodiment, is connected between the analog actual value generator and the processor, and serves to convert the analog actual value of the actuator elements into a digital actual value. This digital actual value is subsequently fed into a computing system, preferably a microprocessor. Alternatively, the A/D converter can be arranged to be ahead of a digital actual value generator. In such arrangements, the analog measured value is converted into a digital measured value. A digital actual value is then formed from the digital measured value in the digital actual value generator. The digital actual value is subsequently fed to a computing system. It is especially advantageous if the digital actual value generator, which, for example, can be an integrator, is integrated software-wise into the computing system such as a microprocessor.

With the help of a computer program stored in the computing system, a digital two-point control is performed by comparing the current converted digital actual value with the digital set point value which was stored in the processor by use of a cyclically commanded interrupt set point/actual value comparison. The manipulated signal obtained with this control logic is subsequently fed to an output driver for the control of the actuator element. In a special embodiment, provisions can be accommodated to again convert the manipulated signal from a digital into an analog signal by use of an digital-to-analog converter. A particular advantage of the digital signal processing in accordance to this invention, as compared to the currently available analog-based electronic control systems for electrohydraulic transmissions, is highlighted by the fact that tolerances associated with the components of the actual value generator or the amplifying circuits can be balanced quite easily and a scaling of the electronic control system can be performed. This is especially advantageous when several actuator elements need to be controlled by one and the same control system, as is the case, for example, in multiplex operation. In such a case, two-step control systems only have the capability to compensate and scale the tolerances of the components of only one channel, whereas the remaining channels have to remain unbalanced.

The scaling of the digital two-step controller can be accomplished quite simply with the help of a reference measurement. In a reference measurement, the value received for the electronic control is compared to a reference value and, based on this comparative assessment, a correction factor is established. This correction factor is preferably stored in a storage area of the processor. Since the correction factor takes into account the tolerances of the individual components, it remains, in this embodiment, constant for the electronic control system once its value has been established. A renewal of the correction factor is only necessary when, for example, repairs need to be performed on the control system, such as the replacement of the actual value generator.

It should be the preference to perform this correction on the set point value, since it changes at a substantially slower rate than the actual value. In doing so, it is possible to economize on computing capacity.

Since a preferred application of the invention-based electronic control of an electrohydraulic control system is intended for a transmission, the actuator elements are referred to as so-called solenoid valves, causing hydraulic pressure changes in the transmission, based on the signals from the electronic control system. In order to freely adjust the course of the hydraulic pressure, the solenoid valves are designed to include a pressure-regulating feature which includes an hydraulic control piston and an electromagnet connected to the top. By adjusting the electromagnetic force, it is possible to change the position of the hydraulic piston and, hence, adjust the pressure. Such pressure-regulating solenoid valves were published in M. Bek "Elektronisches Steuerungssystem fuer Automatgetriebe", special publication by Voith research and design, paper 33 (1989), Voith print G 1225, page 5.6–5.7. The disclosure of this document is fully incorporated by reference herein.

In a first embodiment of this invention, the induced voltage signal of a measured coil is used as analog measuring signal for the magnetic force of the solenoid valve. The measuring coil is saturated by the magnetic field formed by the exciting current of the electromagnet's field coil. Instead of a measuring coil, it is also possible to use a Hall-effect sensor or other devices known to the expert. In reference to the first embodiment, should the need arise to use the voltage signal induced by the measuring coil to infer the actual value of the magnetic force, it is necessary to integrate this analog voltage signal (ref. for example, M. Bek "Elektronisches Steuerungssystem for Automatgetriebe", rest as stated above). In such an electronic control system, the analog measured signal will be fed into an actual value generator which is designed as an integrator. As a general rule, operational amplifiers are applied as integrators.

Depending upon the tolerances of the components used in the circuitry, the actual value generator obtains, correspondingly, a different magnetic force value at the same induced voltage signal. In order to achieve the same control characteristics with different components, it is necessary to account for the tolerances of these components, which is accomplished by performing reference measurements.

In addition to the apparatus, this invention also introduces a process for a digital two-step control of at least one actuator element of an electrohydraulic control system of a transmission, with the aid of an electronic control system. Reference measurements are performed for the purpose of determining correction factors for the electronic control of the actuator element(s). These reference value(s) are stored in a first storage area of the processor's memory. The control process includes the following steps:

An analog measured signal from an actuator is received;

An actual value is formed from the analog signal for the actuator element;

The analog actual value is converted into a digital actual value by the A/D converter and is fed into a first storage area of the processor's memory.

The digital two-step control, in a first version, occurs by comparing the digital actual input value in the processor to a corrected set point value, which is also stored in the processor. This comparative assessment then serves as a starting point for the subsequent steps. In another approach, the digital actual value is subtracted from the corrected digital set point value and, depending on the algebraic sign of the difference, the process proceeds to the next steps, accordingly. In a further solution, a digital hysteresis value, which is characteristic for this controller, is added to the corrected digital set point value. This forms the basis for the adjustment of the hysteresis for the two-step controller. In cases where the actuator element is applied in the form of a solenoid valve, it is possible, through suitable adjustment of the hysteresis on a software basis, to put the solenoid valve piston in a continuous state of micro-motion. This has the benefit of avoiding adverse static friction effects during the control process.

It is seen as an advantage for the sampling time to be in the area of 0.1 to 10 milliseconds. It is especially advantageous to work with a sampling period of one millisecond. A sampling period of approximately one millisecond makes it possible for the digital two-step controller to control the actuator sufficiently fast. At very low measured signal strengths, an amplifying circuit can be used to process this analog signal for the processor. If a magnetizing coil of a solenoid valve is used as an actuator element, it is considered part of the electrohydraulic control system for transmissions. These transmissions are, preferably, so-called torque divider transmissions.

In the section below, this invention is explained in more detail through the use of design examples and graphical representations:

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 3:
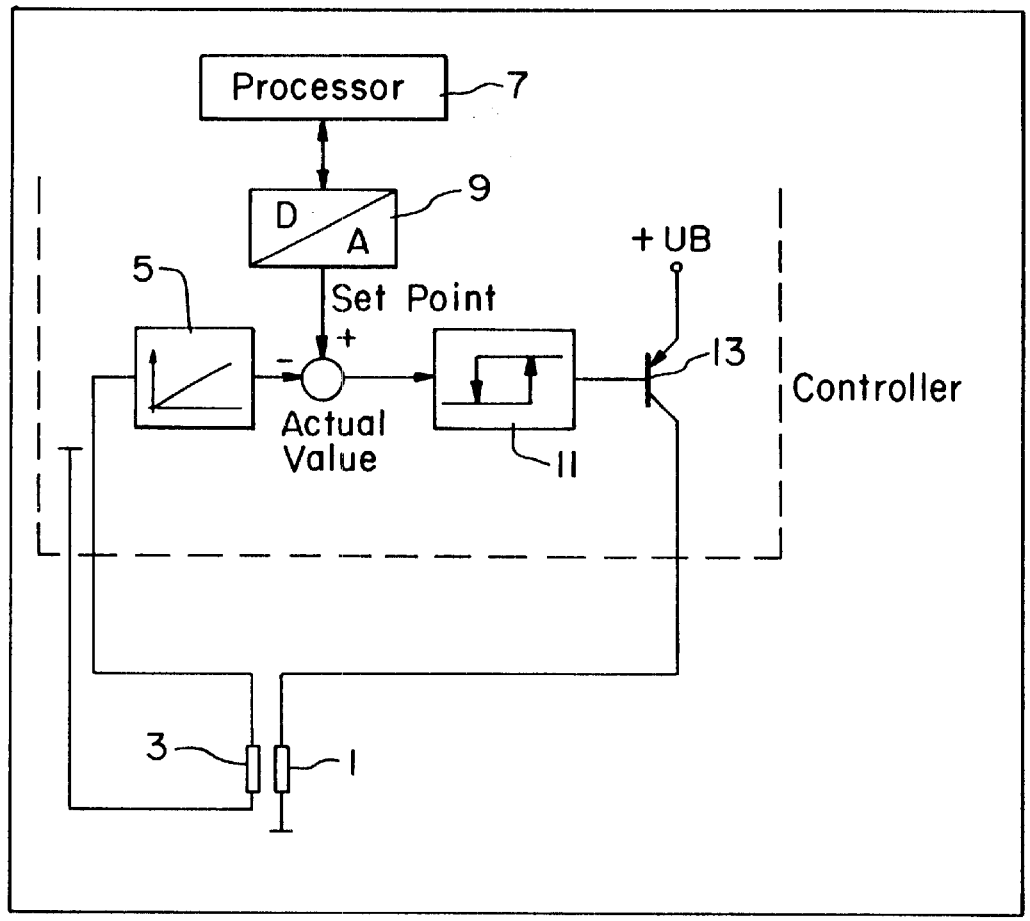
FIG. 3 is a block diagram illustrating the control of the magnetic force in accordance to the state of the art.

FIG. 3 illustrates a block diagram for the state-of-the-art control of the magnetic force of a solenoid valve as it is applied in an electrohydraulic control system of a transmission (M. Bek "Elektronisches Steuerungssystem for Automatgetriebe", rest as stated above). The determination of the magnetic force occurs, in this embodiment, through measuring the change in the magnetic flux of measuring coil 3, which is grouped together with field coil 1. The analog measured signal of measuring coil 3 becomes an actual value generator 5, which forms a magnetic force set point value from the analog measured value. In the embodiment shown, the actual value generator 5 is an integrator. The set point value of the control system is stored in processor 7 and upon retrieval from same, it can be converted into an analog signal with the help of D/A converter 9. A set point value/actual value comparison takes place and the two-step controller 11, in accordance with this set point value/actual value comparison, controls the current through the field coil 1, and, hence, the magnetic force of the solenoid valve through the output of a manipulated value.

Figure 4:
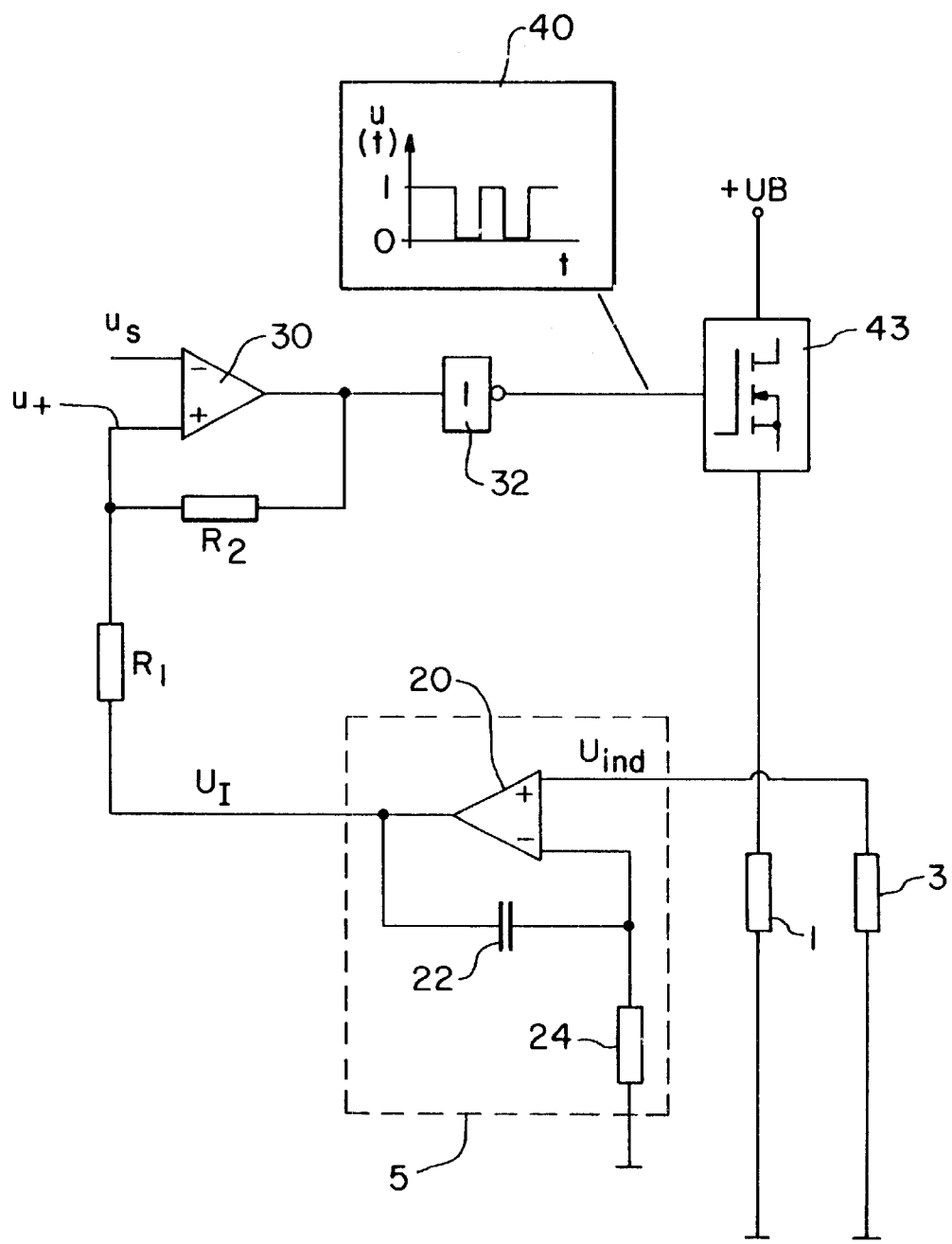
FIG. 4 is electronic circuitry for an electrohydraulic control system, in accordance to the state of the art.

FIG. 4 shows the state-of-the-art circuitry, as depicted in FIG. 3, for the magnetizing coil 1 of the solenoid valve (not shown). A preferred application of the solenoid valve includes the electrohydraulic control system of a transmission (also not shown). As depicted in this representation, the voltage $U_{ind}$, which is induced in measuring coil 3 as a result of changes in the magnetic field of field coil 1, is used for generating the actual value for the control of the magnetic force. The measured signal $U_{ind}(t)$ is supplied to the actual value generator 5. The actual value generator 5 is, as shown, an integrator including operational amplifier 20, which has been correspondingly connected. As is known from the state of the art (Ref. Dubbel, hand book for mechanical engineering, Springer Verlag 1995, Pages W23–W31), the operational amplifier 20, connected as an integrator, includes components such as condenser 22 and resistor 24. Depending on the components that are used, the output of the integrator is a voltage signal U, corresponding to the magnetic force. This signal is supplied in analog form to the operational amplifier 30, which is connected as a comparator. The positive input to comparator 30 is a voltage $U_+$, which corresponds to the actual value $U_I$ minus the voltage drop across the resistor R1. The resistor R2, which is connected between the positive input and output of the operational amplifier 30, determines the hysteresis of the controller shown. The voltage value $U_+$ is compared to the analog set point voltage $U_s$ in the operational amplifier 30 (connected as comparator 30), and, based on this comparative assessment of these analog signals, a digital signal is formed representing a logical 1 (ONE) or a 0 (ZERO). The binary signal is supplied to invertor 32, so that an inverted voltage signal is present at the output of the invertor, as shown on plot 40. The output signal 40 drives output driver 43, which is supplied with voltage $+U_B$. The output driver 43 drives the magnetizing coil 1 which is to be controlled. The compensation of the manufacturing tolerances of the components of actual value generator 5 is accomplished by resistor 24. In accordance to the state of the art, the hysteresis value of the controller must be adjusted by resistor R2. Similarly, the tolerances of the actual value generator 5 are balanced by resistor 24.

Figure 1:
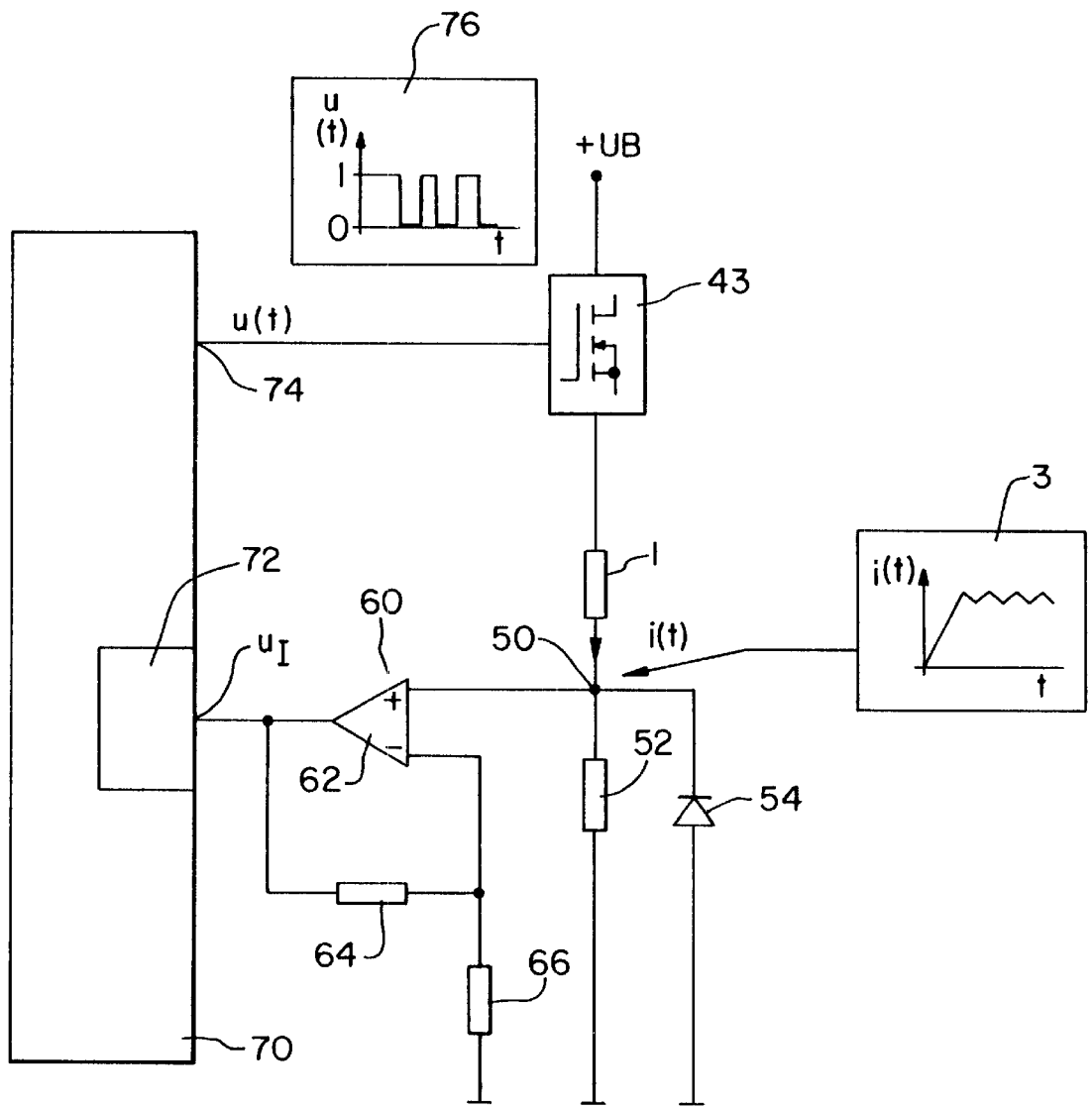
FIG. 1 is electronic circuitry in accordance to this invention for a electrohydraulic control system, whereby the analog measured signal is the current i(t) through the coil.

FIG. 1 illustrates a first embodiment of the circuitry of the present invention. The two-step controller controls a magnetizing coil 1 of a solenoid valve. It is certainly possible to control other actuating elements besides a magnetizing coil having a set point value with the circuitry depicted in FIG. 1.

In the present embodiment, the electrical current i(t) at point 50 of the circuit, which is used as a measured signal for representing the actual value of the magnetic force, is picked up and converted into a voltage value across measuring resistor 52.

Diode 54 is connected in parallel to measuring resistor 52. The measured signal is amplified, in order to form an actual value, by amplifying circuit 60, which includes at least one operational amplifier 62 and resistors 64, 66. The measured signal is supplied as analog actual value $U_I$ to computing device 70, which, in this case, is a microprocessor. The analog actual voltage signal value is then converted by A/D converter 72 from an analog signal to a digital signal and is stored in a digital storage area of computing device 70. A compensation or balance of the component tolerances of the actual value generator, located ahead of resistors 64, 66 of the operational amplifier (connected as an amplifier), is achieved by use of reference measurements. A correction factor K is determined and stored in the storage area of processor 70, allocated for this purpose.

Figure 5:
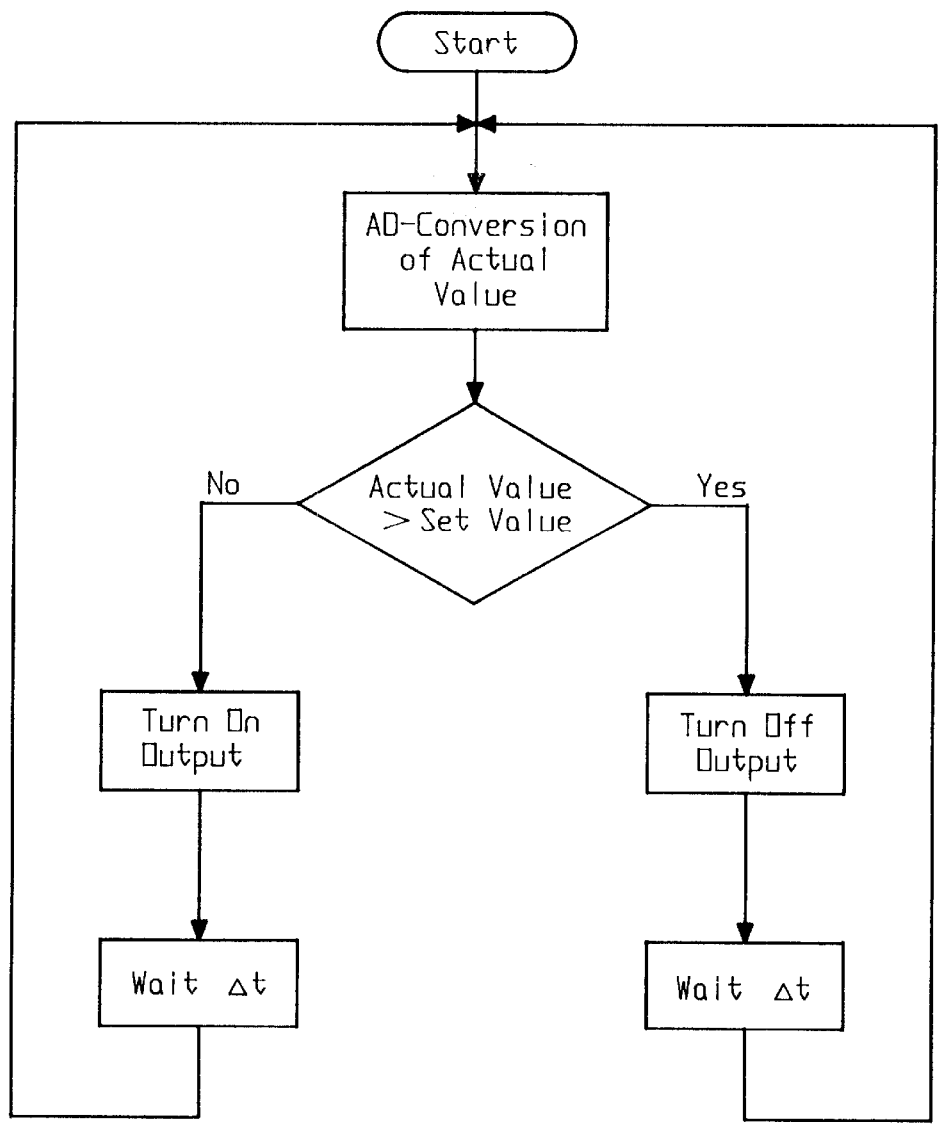
FIG. 5 is a flowchart of a digital two-step controller, as proposed in this invention, and whose function is based on the comparative assessment principle.

In one embodiment of this invention, the digital actual value is compared, as referenced in flow chart of FIG. 5, to the set point value, having been modified by the correction factor K derived from the particular circuitry. Correction factor K is stored in a second area of computing device/control unit 70. If the actual value is greater than or the same as the corrected set point value stored in the computing device, output 74 of the computing device is turned off, i.e., it is set to a logical ZERO. If, on the other hand, the actual value is less than the corrected set point value, then output 74 is turned on, i.e., it is set to a logical ONE. The input of a new actual value via the A/D converter 72, which always has an analog signal attached, is performed after sampling period (Δt) and the previously performed comparative assessment between the actual value and the set point value is renewed. In summary, the resultant voltage progression of output 74 is depicted in plot 76. The sampling interval, in accordance to the individual application of the controller, can vary from 0.1 to 10 milliseconds. Experience has shown a sampling interval of one millisecond to be especially suitable for fast and satisfactory control characteristics. It has proven to be very beneficial to input the actual values into the A/D converter 72 for conversion from an analog into a digital value with the aid of a cyclically-commanded interrupt.

The output signal U(t), according to the embodiment shown in FIG. 4, drives output driver 43, which is connected to magnetizing coil 1.

Figure 2:
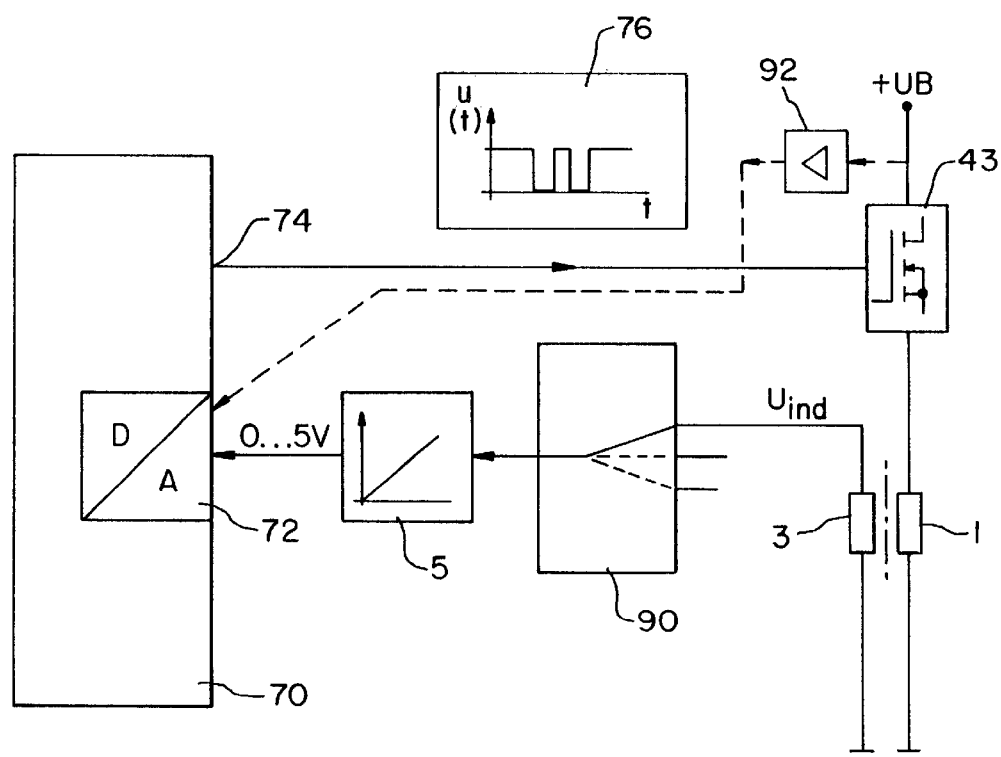
FIG. 2 is electronic circuitry in accordance to this invention, whereby the analog measured signal is the induced voltage (U(t)) in a measuring coil.

FIG. 2 depicts a second embodiment of the circuitry of the present invention. Components shown in FIG. 1 are referenced in FIG. 2 using the same reference numbers. Like the circuitry shown by FIG. 1, the circuitry shown in FIG. 2 also controls a magnetizing coil 1 of a solenoid valve. Voltage $U_{ind}$ is induced as a result of changing magnetic field conditions of measuring coil 3, which is located in the magnetic field of the field coil 1. Voltage $U_{ind}$ is used as a measured signal for the purpose of generating the actual value for the control of the magnetic force of the solenoid valve. Since the Law of Induction states $$U_m(t) \approx d\Phi/dt$$

and, on the other hand, the magnetic force is defined as $$F_m \approx \Phi,$$

an integrator 5 must be employed as the actual value generator for the purpose of generating the actual magnetic force value from the received analog measured signal, as shown in the block diagram of FIG. 3. This integrator is, preferably, connected as an operational amplifier, as depicted in FIG. 4. In case there is a plurality of solenoid valves to be controlled with one and the same control system, a multiplex operation is applied, which is a serial control process of each individual solenoid valve. To this end, the instrument leads of the individual measuring coils 3 of the solenoid valves 1 which are to be controlled are connected to a so-called multiplexer 90, located ahead of the integrator. With the help of the multiplexer 90, the individual channels are interrogated in a serial manner and fed to the actual value generator 5. After integration of the voltage signal of the respective measuring coil 3 with the aid of the integrator 5, an analog actual value signal is present at the output of the actual value generator, which is representative of the magnetic force. This actual value signal is then converted by the A/D converter 72 from an analog to a digital signal and is stored in a first area of computing device 70.

A compensation or balance of the component tolerances of the actual value generator, located ahead of the condenser and the resistor of the operational amplifier, and the balance of the measuring coils assigned to the various channels, is achieved by use of reference measurements for each individual channel. When conducting the reference measurements, correction factors $K_1 \ldots K_n$ are determined for each individual channel, and are stored in computing device 70.

In an alternative embodiment (not shown), the analog integrator can be substituted by a digital integrator, which, for example, can be realized with software in microprocessor or computing device 70. In such an embodiment, the A/D converter would be positioned directly downstream of multiplexer 90 and ahead of a digital integrator.

The digital actual value is, in accordance to the embodiment of the digital two-step controller whose flow chart is shown in FIG. 5, compared to the set point value stored in the second area of the computing device. It would be advantageous for the set point value for each channel to be assigned a correction factor obtained from the reference measurement, since the set point value changes at a slower rate as compared to the actual value. If the actual value is greater than the set point value, having been corrected for each respective channel and stored in memory, output 74 of the computing device 70 is turned off, i.e., it is set to a logical ZERO. If, on the other hand, the actual value is less than the corrected set point value of each respective channel, then output 74 is turned on, i.e., it is set to a logical ONE. The input of a new actual value via the A/D converter, which always has an analog signal attached, is performed after a sampling period (Δt) for the respective channel and the previously performed comparative assessment between the actual value and the corrected set point value is renewed. In summary, the resultant voltage progression of output 74 is depicted in plot 76. The sampling interval, in accordance to the individual application of the controller, can vary from 0.1 to 10 milliseconds. Experience has shown a sampling interval of one millisecond to be especially suitable for fast and satisfactory control characteristics. It has proven to be very beneficial to input the actual values into the A/D converter 72 for conversion from an analog into a digital value and/or to input the actual values into computing device 70 with the aid of a cyclically-commanded interrupt. The output signal U(t) at output 74, according to the embodiment shown in FIGS. 1 and 4, drives output driver 43, which is connected to magnetizing coil 1.

It has been proven especially advantageous for the supply voltage $+U_B$ to be taken into account in the control process. To this end, the actual voltage value $+U_B$ is determined, and after amplification with amplifier 92, supplied to D/A converter 72 and stored in a third storage area of computing device 70. It is then possible, with the help of an additional correction factor, to eliminate the effect of supply voltage $+U_B$ on the resultant magnetic force.

Of course, it is possible to realize other control concepts in the computing device or microprocessor 70 for the circuits shown in FIGS. 1 and 2. For example, it is possible to calculate the difference between the corrected digital actual value and the set point value, instead of performing a direct comparative assessment between them. The difference is subsequently used for the activation or de-activation of output 74, depending on whether the difference is greater or less than zero.

Figure 6:
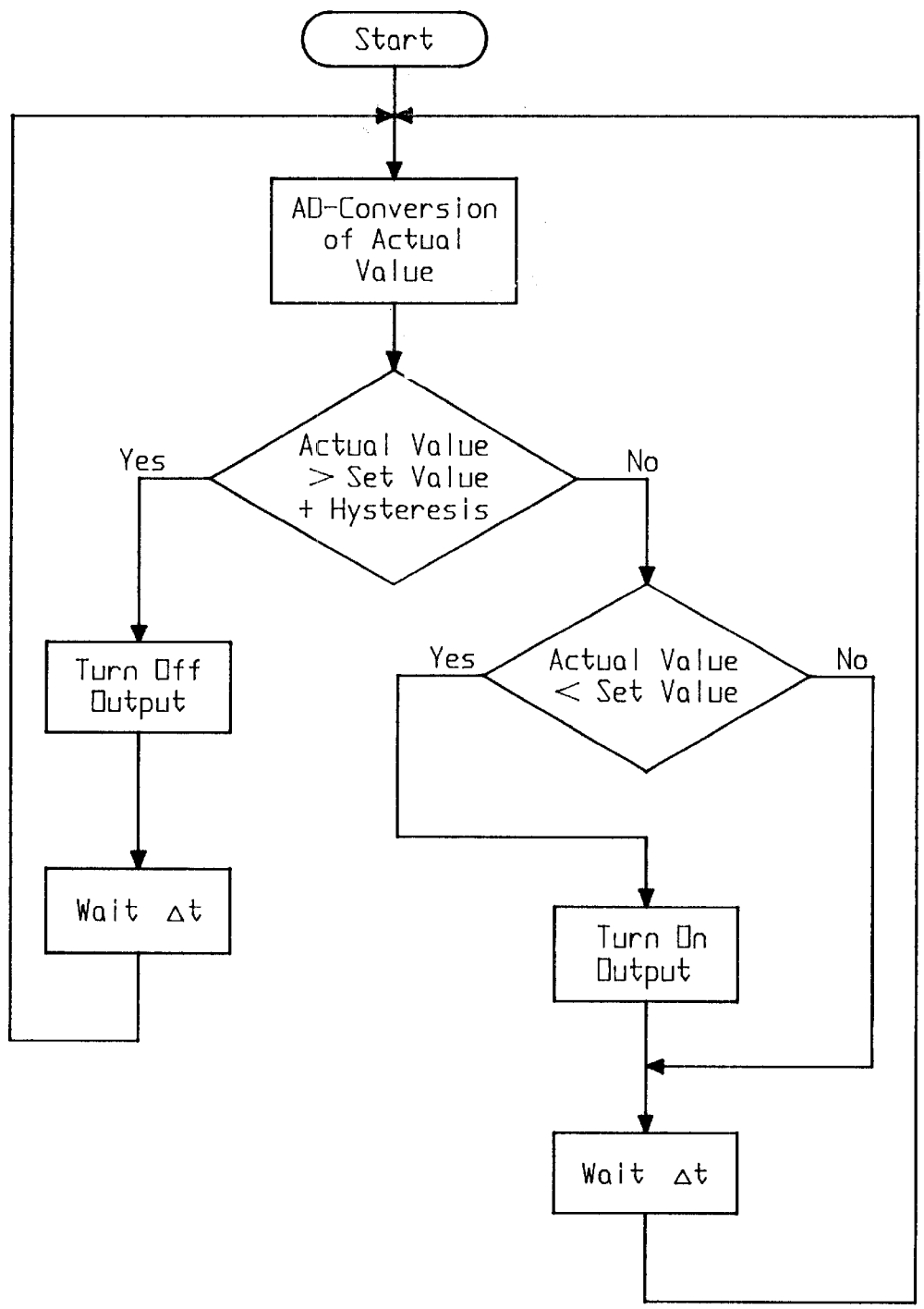
FIG. 6 is a flowchart of a digital two-step controller, as proposed in this invention, with the addition of the hysteresis portion.

In a further development of this invention, it is also possible, as shown in the representation of FIG. 6, to adjust the hysteresis variably, which is required for the stable operation of a two-step controller. This is especially advantageous when a micro-motion of the solenoid valve piston needs to be generated or maintained. The sequence of events and the control of output 74 of the computing device is described below.

If the digital actual value (formerly analog value $U_1$ prior to the conversion) is greater than the sum of a corrected set point value stored in a second area of the control device and a hysteresis value stored in a third area of the control device, output 74 is turned off, i.e., it is set to a logical ZERO. If this is not the case, a subsequent interrogation is performed to determine if the digital actual value is less than the digital corrected set point value. If this is the case, output 74 is turned on, i.e., a logical ONE is issued. If the digital actual value is greater, or the same as the digital corrected set point value, then the output is left in the same position as it was prior to the entry of the actual value into the computer. After sampling period $\Delta t$, a new value is fed to the control device and the previously indicated interrogations are once again initiated. Corresponding to the results, the output is either turned off, turned on, or left in the same position as it was prior to the entry of the value.

With the present invention, it is possible for the first time to control an actuator digitally, which is a solenoid valve for a transmission control unit, while fully accounting for component tolerances. This can be realized with very simple circuitry. Furthermore, the circuitry can be more readily adapted to various operating conditions. Problems associated with static friction effects can be avoided, and off-the-shelf components can be used.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrohydraulic control system for a transmission, comprising:

at least one solenoid valve;

an output driver electrically connected to said at least one solenoid valve;

a measuring coil configured for receiving an analog actuator measured value from said at least one solenoid valve and for receiving an induced voltage signal;

an integrator configured for forming an actual magnetizing force value of said at least one solenoid valve dependent upon said analog actuator measured value for control of said at least one solenoid valve;

a computing device including a memory device; and an electronic control system including:

at least one analog/digital converter configured for conversion of at least one of said actual magnetizing force value and said analog actuator measured value into a digital value; and a digital two-step controller configured for control of said at least one solenoid valve by use of a cyclically-commanded comparison of a set point value to an actual value.

2. An electrohydraulic control system for a transmission, comprising:

at least one actuator;

an output driver electrically connected to said at least one actuator;

a device configured for receiving an analog actuator measured value from said at least one actuator;

an actual value generator configured for forming an actual analog actuator value from said analog actuator measured value for control of said at least one actuator;

a computing device including a memory device;

an electronic control system including:

at least one analog/digital converter configured for conversion of at least one of said actual analog actuator value and said analog actuator measured value into a digital value; and a digital two-step controller configured for control of said at least one actuator by use of a cyclically-commanded comparison of a set point value to an actual value; and a device configured for one of balancing and scaling said digital two-step controller such that, independent of component tolerances of at least one of said actual value generator and said at least one actuators a substantially same control behavior can be consistently achieved for said at least one actuator.

3. The electrohydraulic control system of claim 2, further comprising:

a device configured for one of balancing and scaling said digital two-step controller for execution of reference measurements; and a device configured for determining a correction factor for said set point value of said digital two-step controller.

4. The electrohydraulic control system of claim 1, wherein said at least one actuator comprises at least one solenoid valve.

5. The electrohydraulic control system of claim 4, wherein said device configured for receiving an analog actuator measured value from said at least one solenoid valve comprises a measuring coil configured for receiving an induced voltage signal.

6. An electrohydraulic control system for a transmission, comprising:
- at least one solenoid valve;
- an output driver electrically connected to said at least one solenoid valve;
- a measuring coil configured for receiving an analog actuator measured value from said at least one solenoid valve and for receiving an induced voltage signal;
- an integrator configured for forming an actual magnetizing force value of said at least one solenoid valve from said analog actuator measured value for control of said at least one solenoid valve;
- a computing device including a memory device; and
- an electronic control system including:
   - at least one analog/digital converter configured for conversion of at least one of said actual magnetizing force value and said analog actuator measured value into a digital value; and
   - a digital two-step controller configured for control of said at least one solenoid valve by use of a cyclically-commanded comparison of a set point value to an actual value.

7. An electrohydraulic control system for a transmission, comprising:
- at least one actuator;
- an output driver electrically connected to said at least one actuator;
- a device configured for receiving an analog actuator measured value from said at least one actuator;
- a digitally-based actual value generator configured for forming an actual analog actuator value from said analog actuator measured value for control of said at least one actuator;
- a computing device including a memory device; and
- an electronic control system including:
   - at least one analog/digital converter disposed before said actual value generator and configured for conversion of at least one of said actual analog actuator value and said analog actuator measured value into a digital value; and
   - a digital two-step controller configured for control of said at least one actuator by use of a cyclically-commanded comparison of a set point value to an actual value.

8. The electrohydraulic control system of claim 7, wherein said computing device includes said actual digital value generator, said actual digital value generator comprising a digital integrator.

9. An electrohydraulic control system for a transmission, comprising:
- a plurality of actuators;
- an output driver electrically connected to said at least one actuator;
- a device configured for receiving an analog actuator measured value from said at least one actuator;
- an actual value generator configured for forming an actual analog actuator value from said analog actuator measured value for control of said at least one actuator;
- a computing device including a memory device; and
- an electronic control system including:
   - a multiplexer configured for sequential control of said plurality of actuators;
   - at least one analog/digital converter configured for conversion of at least one of said actual analog actuator value and said analog actuator measured value into a digital value; and
   - a digital two-step controller configured for control of said at least one actuator by use of a cyclically-commanded comparison of a set point value to an actual value.

10. Method for digital two-step control of at least one actuator of an electrohydraulic control system for a transmission, using an electronic control system, said method comprising the steps of:
- conducting measurements of reference values in order to determine correction factors for electronic control of the at least one actuator;
- storing said reference values in a first storage area of a memory device of a computing device designated for said reference values;
- storing said correction factors in a second storage area of said memory device designated for said correction factors; and
- repeating the following substeps in a cyclically-commanded interrupt corresponding to a sampling period:
   - receiving an electronic analog measured signal from an actuator of the at least one actuator;
   - forming an analog actual value of said actuator from said analog measured signal;
   - converting said analog actual value into a digital actual value with an analog/digital converter;
   - storing said digital actual value in a third storage area in said memory device;
   - storing a digital set point value for said actuator in a fourth storage area in said memory device;
   - comparing said digital actual value to said digital set point value;
   - one of scaling and multiplying said digital set point value by said correction factor of said actuator;
   - connecting an output of said computing device to an output driver;
   - setting said output of said computing device to a logical ZERO if said digital actual value is one of greater than and equal to said digital set point value;
   - setting said output of said computing device to a logical ONE if said digital actual value is less than said digital set point value; and
   - receiving a new analog actual value with said actuator after said sampling period.

11. Method for digital two-step control of at least one actuator of an electrohydraulic control system for a transmission, using an electronic control system, said method comprising the steps of:
- conducting measurements of reference values in order to determine correction factors for electronic control of the at least one actuator;
- storing said reference values in a first storage area of a memory device of a computing device designated for said reference values;
- storing said correction factors in a second storage area of said memory device designated for said correction factors; and
- repeating the following substeps in a cyclically-commanded interrupt corresponding to a sampling period:
   - receiving an electronic analog measured signal from an actuator of the at least one actuator;
   - forming an analog actual value of said actuator from said analog measured signal;

converting said analog actual value into a digital actual value with an analog/digital converter;

storing said digital actual value in a third storage area in said memory device;

storing a digital set point value for said actuator in a fourth storage area in said memory device;

subtracting said digital set point value from said digital actual value in order to arrive at a difference value;

connecting an output of said computing device to an output driver;

setting said output of said computing device to a logical ZERO if said difference value is one of greater than and equal to zero;

setting said output of said computing device to a logical ONE if said difference value is less than zero; and receiving a new analog actual value with said actuator after said sampling period.

12. Method for digital two-step control of at least one actuator of an electrohydraulic control system for a transmission, using an electronic control system, said method comprising the steps of:

conducting measurements of reference values in order to determine correction factors for electronic control of the at least one actuator;

storing said reference values in a first storage area of a memory device of a computing device designated for said reference values;

storing said correction factors in a second storage area of said memory device designated for said correction factors; and repeating the following substeps in a cyclically-commanded interrupt corresponding to a sampling period:

receiving an electronic analog measured signal from an actuator of the at least one actuator;

forming an analog actual value of said actuator from said analog measured signal;

converting said analog actual value into a digital actual value with an analog/digital converter;

storing said digital actual value in a third storage area in said memory device;

storing a corrected digital set point value for said actuator in a fourth storage area in said memory device;

adding said corrected digital set point value to an adjustable digital hysteresis value for said actuator to arrive at a digital sum value;

storing said digital sum value in a fifth storage area in said memory device;

comparing said digital actual value to said digital sum value;

connecting an output of said computing device to an output driver;

setting said output of said computing device to a logical ZERO if said digital actual value is one of greater than and equal to said digital sum value;

comparing said digital actual value to said digital set point value if said digital actual value is less than said digital sum value;

setting said output of said computing device to a logical ONE if said digital actual value is less than said digital set point value;

inhibiting setting of said output of said computing device if said digital actual value is one of greater than and equal to said digital set point value; and receiving a new analog actual value with said actuator after said sampling period.

13. The method of claim 12, wherein said sampling period is approximately between 0.1 milliseconds and 10 milliseconds.

14. The method of claim 12, wherein said sampling period is approximately 1 millisecond.

15. The method of claim 12, wherein said actuator comprises a solenoid valve.

* * * * *